Oct. 16, 1962     M. J. CORBETT     3,058,449
ROCKET ENGINE CONTROL
Filed March 2, 1959     3 Sheets-Sheet 3
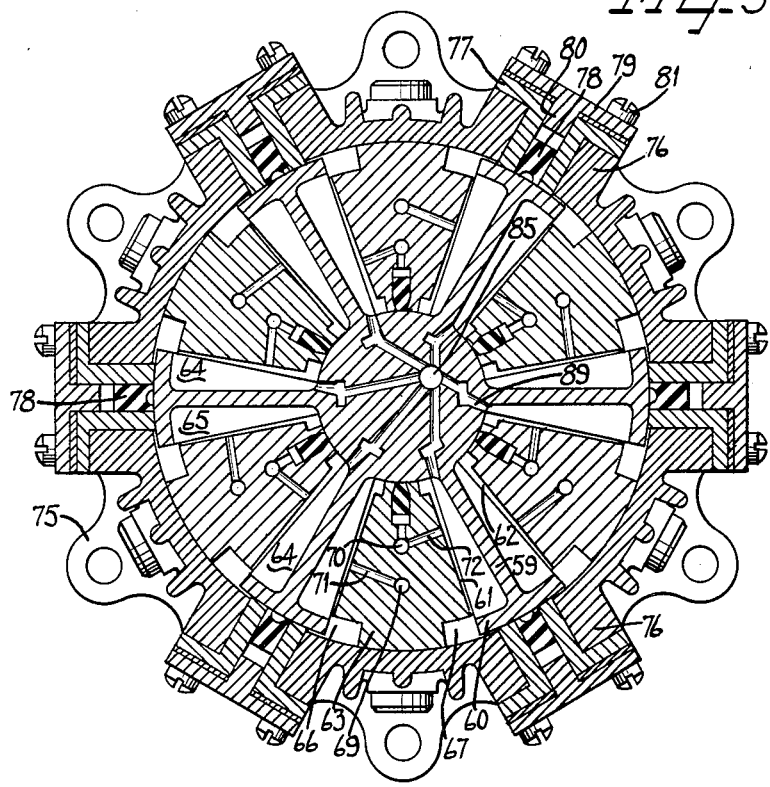
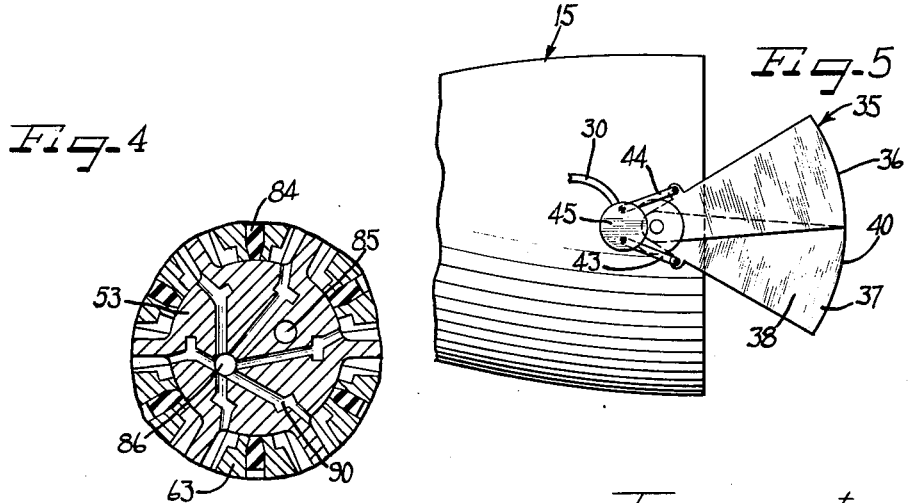
Inventor
Marshall James Corbett

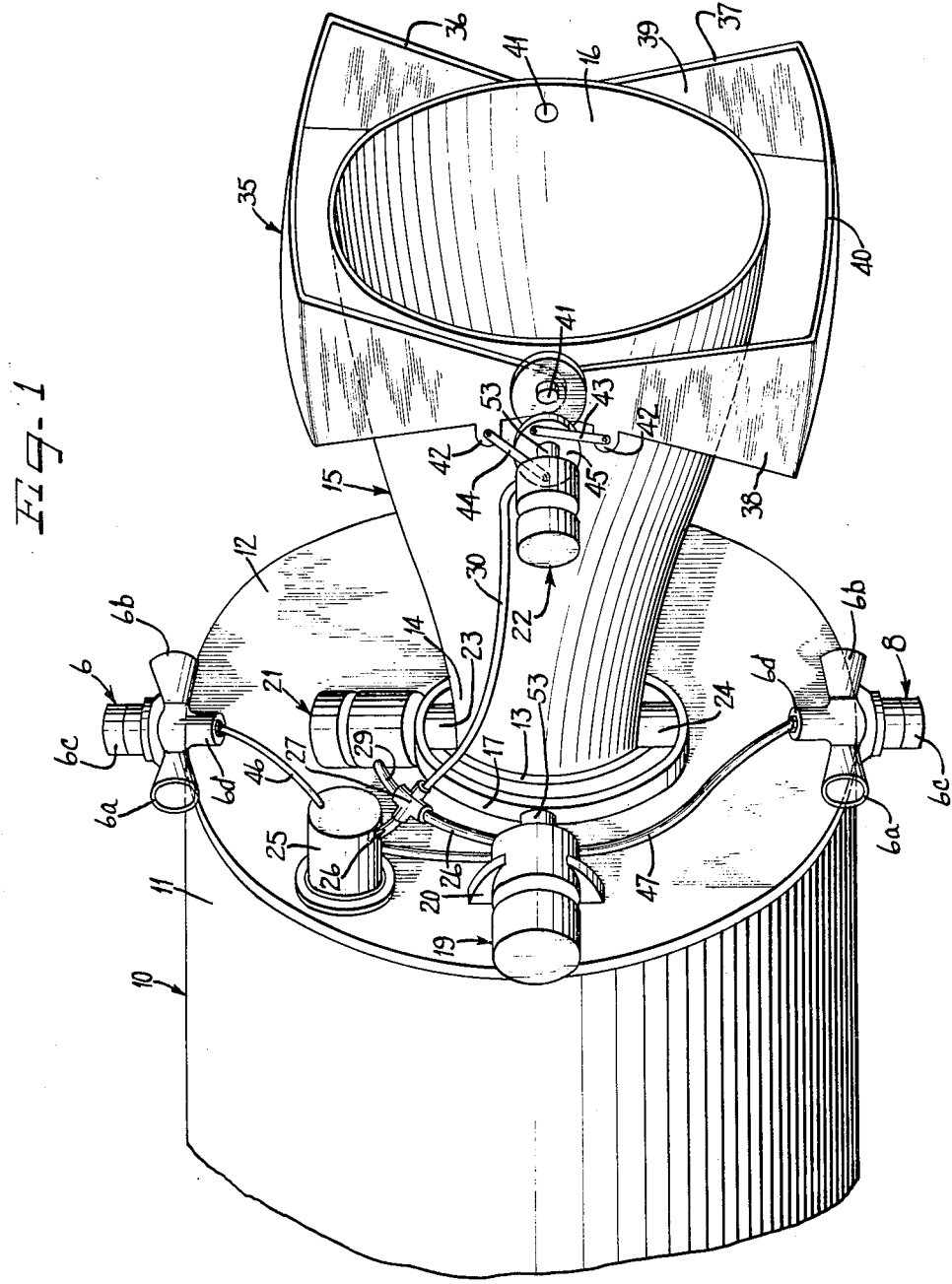

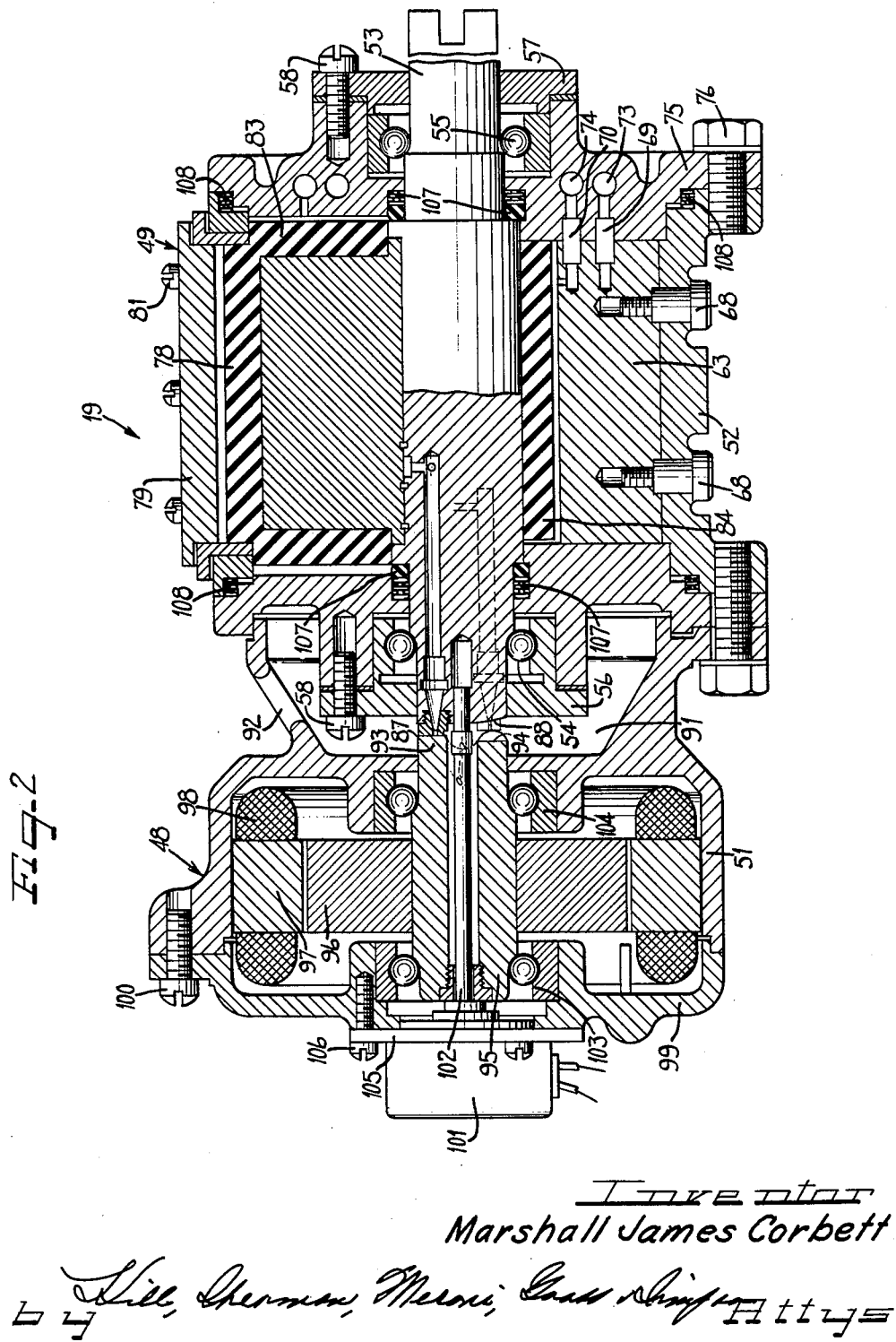

United States Patent Office 3,058,449
Patented Oct. 16, 1962

3,058,449
ROCKET ENGINE CONTROL
Marshall James Corbett, Cleveland, Ohio, assignor to Thompson Ramo Wooldridge Inc., Cleveland, Ohio, a corporation of Ohio
Filed Mar. 2, 1959, Ser. No. 796,557
10 Claims. (Cl. 121—41)

The present invention relates broadly to rocket engines, and is more particularly concerned with new and improved actuator means having especial utility in performance of the functions of pitch and yaw control and thrust reversal in rocket engines and related airborne vehicles.

It is an important aim of the present invention to provide actuator means adapted to be connected to a solid propellant gas generator, and particularly suitable in effecting tilting movement of a single main thrust nozzle for rocket yaw and pitch control, as well as related applications exemplified by movement of thrust reversal means into the exhaust gas stream.

Another object of this invention is to provide a rotary gas actuator featuring therein a plurality of chambers receiving vanes mounted by a shaft having gas flow passages communicating through the chambers with a gas supply and opening in one end of the shaft in close proximity to shaft means of a motor or the like, whereby one of the passages in the actuator shaft is essentially closed by the motor shaft to create a condition of pressure unbalance to thereby effect rotation of the actuator shaft.

A further object of the present invention lies in the provision of a rotary gas actuator comprising a housing and a shaft supported therein provided with a plurality of gas flow passages terminating at one end of said shaft, means in said housing defining a plurality of circumferentially spaced vane chambers, and a plurality of vane members on the shaft extending radially into the vane chambers and dividing the same into a pair of compartments each of which is in communication with the passages in the shaft, the housing and the means therein defining the vane chambers being passaged to supply gas to each compartment and from said compartments through the passages in the shaft to the end thereof, said gas continuously flowing from the shaft passages until one of said passages is essentially blocked whereupon a pressure unbalance is created and the actuator shaft caused to rotate.

Other objects and advantages of the present invention will become more apparent during the course of the following description, particularly when taken in connection with the accompanying drawings.

In the drawings, wherein like numerals are employed to designate like parts throughout the same:

FIGURE 1 is a side elevational view of one end of a rocket engine mounting thereon actuator means constructed in accordance with the principles of this invention;

FIGURE 2 is a sectional view taken longitudinally through a preferred form of actuator means;

FIGURE 3 is a sectional view of the rotary section of the actuator means of FIGURE 2;

FIGURE 4 is a fragmentary detail sectional view of the actuator shaft and surrounding structure to show more clearly a second set of gas flow passages in the actuator shaft; and FIGURE 5 is a side elevational view of a portion of the single main thrust nozzle of FIGURE 1, and showing the thrust reversing means mounted thereon in an essentially closed position.

Briefly stated, the present invention is directed to gas actuator means of the rotary type provided with a housing supporting therein a passaged shaft to be located in close adjacency to shaft means of a torque motor or related driving means, the motor means having a housing connecting with the actuator housing. The latter housing supports interiorly a plurality of circumferentially spaced stationary block members defining therebetween vane chambers receiving radially extending vanes on the actuator shaft. The block members and housing are passaged to provide communication with a solid propellant gas generator from which high pressure operating gas is directed to opposite surfaces of the vanes in each chamber. The actuator shaft has two sets of passages, each comprising a plurality of radial portions communicating with opposite surfaces of the vanes and an axial portion connecting with the radial portions and opening in a cam surface on the end of the actuator shaft adjacent the motor shaft. An electrical signal from the autopilot system rotates the motor shaft to block one of the passages in the actuator shaft to create a greater pressure in one set of vane chambers than the other to rotate the actuator shaft. While the applications for the actuator means of this invention are varied and numerous, the actuator shaft may be connected to gimbal means and the rocket engine nozzle to tilt the same for pitch or yaw control, or the actuator shaft may connect with thrust reversal means. Other applications and the structural features of the actuator will become more apparent as the description now proceeds.

A particularly suitable environment for the actuator means of this invention is in association with a rocket engine designated generally in FIGURE 1 by the numeral 10, and provided with a generally cylindrical housing 11 defining interiorly a combustion chamber and mounting an end wall 12 at the exhaust end or hot side of the engine 10. The end wall is provided with an opening generally centrally thereof, as indicated by the numeral 13, to receive therein for tiltable movement neck portion 14 of a single main thrust nozzle 15, which may be of the general frusto-conical shape shown and extending axially outwardly from the engine housing 11. Exhaust gases are discharged from the nozzle 15 through a relatively wide mouth or discharge portion 16.

The nozzle 15 tilts through an angle of about plus 5° and minus 5° with respect to the longitudinal axis of the housing 11 and with respect to a transverse axis intersecting the housing longitudinal axis. In the position of the rocket engine 10 shown in FIGURE 1, the longitudinal axis is also the horizontal axis, and the transverse axis is the vertical axis, and will be designated as such during the following description. The neck portion 14 of the nozzle 15 is supported by the end wall portions surrounding the opening 13, and circumferentially spaced in surrounding relation to the neck portion 14 is a gimbal ring 17. To effect tiltable movement of the nozzle 15 about a horizontal axis for pitch control, the gimbal ring 17 connects with shaft means 53 rotated by actuator means 19 attached by flange means 20 to the housing end wall 12.

Yaw control, on the other hand, is accomplished by utilization of actuator means 21, preferably of the same character as the actuator means 19. The actuator 21 is supported by the gimbal ring 17 at a location circumferentially spaced about 90° from the shaft connection 53 of the actuator 19 with the gimbal means 17. The actuator 21 is provided with a shaft (not shown) of the same character as the shaft 53 of the actuator means 19, and said actuator shaft connects with a stub shaft 23 rigid with the nozzle neck portion and rotatable with respect to the gimbal means 17. At a diametrally opposed location on the nozzle neck portion 14, and essentially in alignment with the vertical or transverse axis of the rocket engine housing 11, there is provided a second stub shaft 24 which rotates upon the inner diameter of the gimbal ring 17 and is suitably secured to the nozzle neck portion 14. If desired, the stub shaft 23 may be replaced by the rotatable shaft of the actuator means 21.

Supported by the end wall 12 of the housing 11 at diametrally opposed locations and essentially in alignment with the stub shafts 23 and 24 is a pair of roll control nozzle means 6 and 8. These nozzles may take various forms and the structural details thereof form no part of the present application. However, each nozzle 6 or 8 may embody oppositely facing nozzle portions 6a and 6b, one of which is selectively opened by action of torque motor means 6c operating a valve assembly within the nozzle 6 or 8 to provide a flow passage from inlet 6d to either of the nozzle members 6a or 6b. The torque motor 6c receives an electrical signal from the rocket autopilot system to open either of the nozzle members 6a or 6b, and the torque motors for the nozzles 6 and 8 are reversed so that thrust is provided in the same direction to rotate the rocket. As for example, to roll the rocket in a clockwise direction, the nozzle member 6b of each roll control nozzle 6 and 8 exhausts hot gases.

To drive the actuators 19 and 21 for pitch and yaw control purposes, to provide thrust for the roll control nozzles 6 and 8 through connections 46 and 47, and to operate a companion actuator 22 when thrust reversal means are provided, the rocket engine 10 mounts gas generator means 25, which may be in the form of a tank or container supported by the end wall 12 of the housing 11. The gas generator houses a propellant which preferably is of the solid type, and experience to date indicates that a nitroguanadine trippel base composition is highly desirable.

The use of a gas generator 25 solely for the purpose of driving the three actuator means 19, 21 and 22, and to provide a gas supply to the roll control nozzles 6 and 8, is considered to have important advantages over the use of the main propellant charge for these purposes. First, the gas servo or actuator pressures can be a factor of three higher than the usually available rocket combustion chamber pressure, which is generally of the order of about 500 p.s.i.a. This means that the system's stiffness is equally better, and the gas actuator is about one-third the size and weight. Accordingly, a net weight saving is effected when a relatively small separate high pressure gas generator 25 is employed. Second, the actuators herein employed have relatively small internal flow passages, necessitating absolute cleanliness of the gases used to operate the actuators. Gases from the main propellant charge frequently contain either solid or liquid oxides, and these could well have a deleterious effect upon the actuator operation. Third, the temperature of the gases from a separate gas generator 25 may be about 4000° F. cooler than the main propellant gases. While diluents could of course be added to the main propellant gases, the weight and complexity of diluent systems is substantially greater than a relatively cool (1200° F.) burning gas generator 25.

The propellant contained in the gas generator 25 may be ignited in any suitable manner, and ignition means of the squib type may be employed for this purpose. To direct the gases from the generator 25 to the actuators 19, 21 and 22, a main conduit or connection 26 is provided leading to a four-way connecting member 27 from which branch connections 28, 29 and 30 are taken to the actuator means 19, 21 and 22, respectively.

If desired, the rocket engine 10 of FIGURE 1 may embody therein thrust reversal means generally indicated by the numeral 35 and mounted by the single main thrust nozzle 15 along the longitudinal axis thereof and inwardly of the mouth portion 16. Such means may comprise a pair of clamshell members 36 and 37, each being provided with a pair of spaced generally flat side wall portions 38 and 39 connected by a curved arcuate end portion 40. The side portions 38 and 39 of each clamshell member 36 and 37 are apertured adjacent their inner ends for receival upon pin means 41, and outwardly of the pin means each side portion 38 is formed with ear 42, and to said ears there are connected link arms 43 and 44 pinned or otherwise secured to a circular disc 45. The disc member 45 receives the shaft 53 of the actuator 22 for rotation when an electrical signal is received by the actuator means 22 from the autopilot system. Rotation of the actuator shaft 53 causes corresponding rotation of the disc member 45 to move the clamshell members 36 and 37 into an open or closed position. Specifically, clockwise rotation of the shaft 53 and disc member 45 translates the link arms 43 and 44 to move the clamshell members 36 and 37 rearwardly to a closed or partially closed position, at which time the link arms 43 and 44 are extended essentially rearwardly, as shown in FIGURE 5. If required, the thrust reversal means 35 may employ in association therewith suitable stop means in the form of abutment blocks or the like, which may be attached to the thrust nozzle to limit the extent of opening movement of the clamshell members 36 and 37.

The present application is more specifically directed to the provision of actuator means 19, 21 and 22 for accomplishment of one or more of the functions of pitch and yaw control and thrust reversal, and to actuator means embodying essentially the structural features shown in FIGURES 2, 3 and 4 of the drawings. It is of course appreciated that the actuator means 19, 21 and 22 are identical in construction, and accordingly the description now to follow will be directed to the actuator means 19.

The actuator assembly 19 comprises a torque motor portion 48 and actuator portion 49 connected one to the other by bolt means 50 engageable with torque motor housing 51 and actuator housing 52. Extending axially within the actuator housing 52 is an actuator shaft 53 supported inwardly of opposite ends by bearing means 54 and 55, which preferably are of the preloaded angular contact type, in order to allow for relative radial growth of the housing and shaft, and still provide accurate concentricity of the rotating and stationary assemblies. The bearing means are maintained in position by abutment with plate members 56 and 57, respectively, bolted as at 58 to opposite ends of the actuator housing 52.

Inwardly of its opposite ends the actuator shaft 53 has Nicro-brazed or otherwise secured thereto six radially extending vanes 59 each formed with an end portion or web 60 thereon and rotatable between adjacent surfaces 61 and 62 of six stationary abutment blocks 63. The surfaces 61 and 62 in cooperation with each vane 59 define a pair of vane chambers 64 annd 65. It is to be seen from FIGURE 3 that each abutment block 63 is notched or grooved axially at a pair of circumferentially spaced locations 66 and 67 for receiving the web portion 60 of each vane 59 during rotation in either a clockwise or counter-clockwise direction upon rotation of the actuator shaft 53.

Each stationary abutment block 63 receives bolt means or the like 68 securing the same to the actuator housinng 52, and each block 63 is provided with a pair of radially spaced and axially extending passages 69 and 70 connecting therein with a pair of transverse passages 71 and 72, respectively, the passage 72 directing hot gas to the chamber 65 and the passage 72 leading to the vane chamber 64. The axially extending passages 69 and 70 in each abutment block 63 communicate with axially extending passages 73 and 74 in cover member 75 attached by bolt means or the like 76 to the actuator housing 52. Suitable connections are of course made from the axial passages 73 and 74 in the cover member 75 to the conduit means 28, 29 or 30 leading from the gas generator 25 of FIGURE 1.

Radially outwardly of the vanes 59 the outer diameter of the housing 52 is formed with a plurality of circumferentially spaced raised portions 76 (FIGURE 3) passaged to receive sleeve means 77 supporting seal means 78 in rubbing contact with the web portion 60 of each vane 59. Each raised portion 76 on the housing outer diameter receives cap means 79 which may be shaped with an inwardly extending tongue portion 80 closing the seal chamber, the cap means 79 being screwed or otherwise secured as at 81 to the housing raised portions 76. The seal means 78 may be of the pressure loaded carbon type, and as shown in FIGURE 2, similar seals 82 and 83 are provided at opposite ends of each vane 59, and additional seal means 84 are housed in suitable recesses extending axially along the radially inwardly portions of each of the abutment blocks 63. It is thus to be seen that the vane chambers 44 and 45 defined between adjacent surfaces 61 and 62 of the abutment blocks 63 and the vane 59 are essentially surrounded by the seal means 78, 82, 83 and 84, and hot gas leakage therefrom effectively precluded.

The actuator shaft 53 is provided with a pair of radially spaced and axially extending exhaust passages 85 and 86 terminating in suitably cammed surfaces 87 and 88, respectively, on one end of said shaft. As appears in FIGURES 2 and 3, the axial passage 85 communicates with generally radially extending passages 89 in the actuator shaft 53, the radial passages 89 exhausting hot gas from the vane chamber 64, while as best shown in FIGURE 4, the axial passage 86 in the shaft 53 connects with radially extending passages 90 exhausting each of the vane chambers 65. It is thus to be seen that hot gas entering the vane chamber 64 through the axial passage 74 in the cover member 75 and into the axial passage 70 in the abutment block 63 and through the transverse passage 72 communicating therewith is exhausted through the radial passages 89 into the axial passage 85 in the shaft 53 and outwardly therefrom at the cam surface 87 at one end of said shaft. Similarly, the vane chamber 65 receives hot gas through the passages 73, 69, and 71, the gas from said chamber 65 being exhausted through the radial passages 90 in the actuator shaft 53, the radial passages 90 connecting with the axial passage 86 in said shaft which terminates at the cam surface 88 thereof. Each of the axial passages 85 and 86 are in communication with an annular chamber 91 defined by housings 51 and 52 of the torque motor 48 and actuator 49, the chamber 91 exhausting to ambient through an aperture 92 therein.

As is also shown in FIGURE 2, the cam surfaces 87 and 88 on the actuator shaft 53 are in close relation with cam surfaces 93 and 94 on torque motor shaft 95. When the torque motor 48 and actuator 49 are in phase with respect to one another the cam surfaces 93 and 94 on the torque motor shaft 95 release gas from the axial passages 85 and 86 in the actuator shaft 53 at identical rates. However, when the torque motor shaft 95 is caused to rotate by a signal from the rocket autopilot system, either of the cam surfaces 93 or 94 on the torque motor shaft 95 blocks one of the axial passages 85 or 86 in the actuator shaft 53 ahead of the direction of rotation, and opens the exhaust area a behind the direction of rotation. This results in rotation of the actuator shaft 53 and a pressure unbalance in the vane chambers 64 and 65, which unbalance continues until the vane 59 is rotated by pressure building up in either of the chambers 64 and 65, whereupon the cam surfaces on the torque motor shaft and actuator shaft are in equal bleed-out orifice gap relation and the torque motor 48 is again in phase therewith.

The torque motor 48 is preferably a reversible electric motor of the two phase induction type having a squirrel cage armature 96 rotatable within a stator 97 having windings 98 thereon. The torque motor housing 51 may mount a cover member 99 by bolt means or the like 100, and carried by the cover member 99 may be a feedback potentiometer 101 driven by a relatively small quill shaft 102 extending axially within the torque motor shaft 95 and received in one end of the actuator shaft 53 for rotation therewith. The torque motor shaft 95 may be mounted in bearing means 103 and 104 of the same character as the bearing means 54 and 55 mounting the actuator shaft 53. The potentiometer 101 may be angularly indexed in order to zero-in the potentiometer's null to the zero deflection position of the single main thrust or vector nozzle of FIGURE 1. This may be accomplished by adjustment of a plate member 105 supporting the potentiometer 101 and mounted by the torque motor cover member 99 by screws or the like 106. Although not specifically described hereinabove, the actuator 49 is made essentially completely gas tight by utilization of suitable seal means throughout, and such means may include bellows shaft seals 107 contacting the actuator shaft 53 adjacent the vane chambers 64 and 65, and similar bellows seal means 108 inwardly of the bolt means 50 and 76 securing the torque motor housing 51 to the actuator housing 52 and the actuator housing cover member 75 to the actuator housing 52.

It is to be seen from the foregoing that there is herein provided a rotary gas actuator assembly featuring therein a plurality of chambers receiving vanes mounted by a shaft having gas flow passages communicating through the chambers with a gas supply and opening in one end of the shaft in close proximity to shaft means of a motor or the like, whereby one of the passages in the actuator shaft is essentially closed by the motor shaft to effect rotation of the actuator shaft and tilting movement for pitch and yaw control and operation of thrust reversal means where provided. The rotary assembly disclosed is accurate and reliable in its operation, and since both the torque motor input and actuator output are rotary, the number of mechanisms required to operate effectively in hot environments are reduced. The weight requirements of the rotary actuator are substantially less than for a linear actuator with supporting structure and cranks, and by way of specific example, the complete weight of a 10,000 in. lbs. hot gas actuator is approximately 6.5 lbs.

This application is related to application Serial No. 796,311, filed March 2, 1959, directed particularly to the combination of FIGURE 1, and is also related to application Serial No. 796,556, filed March 2, 1959, directed particularly to the roll control nozzles 6 and 8 of FIGURE 1.

It is of course to be further understood that various changes and modifications may be effected in the structures herein disclosed without departing from the novel concepts of the present invention.

I claim as my invention:

1. A rotary gas actuator, which comprises a housing and a shaft supported therein provided with a plurality of gas flow passages opening at one end of said shaft, means in said housing and rigidly connected thereto defining a plurality of circumferentially spaced vane chambers, and a plurality of solid vane members on the shaft extending radially into the vane chambers and dividing each of the chambers into a pair of compartments each of which is in direct communication with the passages in the shaft, the housing and the means therein defining the vane chambers having spaced and independent gas flow passages supplying gas to each compartment and from said compartments through the passages in the shaft to the end thereof, said gas continuously flowing from the shaft passages until one of said passages is essentially blocked whereupon a pressure unbalance is created and the actuator shaft caused to rotate.

2. A rotary gas actuator, which comprises a housing and a shaft supported therein provided with two sets of radially and axially extending gas flow passages opening at one end of said shaft, means in said housing and rigidly connected thereto defining a plurality of circumferentially spaced vane chambers, and a plurality of solid vane members on the shaft extending radially into the vane chambers and dividing each of the chambers into a pair of compartments each of which is in direct communication with the radial portion of the gas flow passages in the shaft, the housing and the means therein defining the vane chambers having spaced and independent gas flow passages supplying gas to each compartment and from said compartments first through the radial and then through the axial passages in the shaft to the end thereof, said gas continuously flowing from the two sets of shaft passages until one of said passages is essentially blocked whereupon a pressure unbalance is created and the actuator shaft caused to rotate.

3. A rotary gas actuator, which comprises a housing and a shaft supported therein provided with a plurality of gas flow passages opening at one end of said shaft, a plurality of circumferentially spaced block members in said housing and rigidly connected thereto defining therebetween a plurality of vane chambers, and a plurality of solid vane members on the shaft extending radially into the vane chambers and dividing each of the chambers into a pair of compartments each of which is in direct communication with the passages in the shaft, the housing and each of the block members having spaced and independent gas flow passages supplying gas to each compartment and opposite surfaces of each vane member and from said compartments through the passages in the shaft to the end thereof, said gas continuously flowing from the shaft passages until one of said passages is essentially blocked whereupon a pressure unbalance is created and the actuator shaft caused to rotate.

4. A rotary gas actuator, which comprises a housing and a shaft supported therein provided with two sets of gas flow passages each comprising a plurality of generally radial portions located between opposite ends of the shaft and an axially extending portion communicating therewith and terminating at one end of said shaft, means in said housing and rigidly connected thereto defining a plurality of circumferentially spaced vane chambers, and a plurality of vane members on the shaft extending radially into the vane chambers and dividing each of the chambers into a pair of compartments, the compartment on one surface of the vane members being in direct communication with the radial portions of one set of gas flow passages and the compartment on the opposite surfaces directly communicating with the radial portions of the other set of gas flow passages in the shaft, the housing and the means therein defining the vane chambers having spaced and independent gas flow passages supplying gas to each compartment and from said compartments through the two sets of passages in the shaft to end thereof, said gas continuously flowing from the shaft passages until one of two sets of passages is essentially blocked whereupon a pressure unbalance is created and the actuator shaft caused to rotate.

5. In combination with a torque motor having a shaft, the improvement which comprises an actuator having a housing and a radially passaged shaft therein provided with a cam surface at one end and axial passages communicating with the radial passages and terminating at said end in close relation to one end of the torque motor shaft, means in said housing and rigidly fixed thereto defining a plurality of circumferentially spaced vane chambers, and a plurality of vane members extending radially from the actuator shaft into the vane chambers to divide each of the chambers into a pair of compartments each of which is in communication with a generally radial passage in the actuator shaft, the means defining the vane chambers and the housing having spaced and independent gas flow passages supplying gas to each compartment whereupon gas is continuously ported from the cam surface of the actuator shaft until the torque motor shaft is rotated to essentially close one of the axial passages terminating at said cam surface to create a pressure unbalance and cause rotation of the actuator shaft.

6. In combination with a torque motor having a shaft, the improvement which comprises an actuator having a housing and a shaft supported therein provided with a cam surface at one end closely adjacent one end of the torque motor shaft, the actuator shaft being provided with two sets of gas flow passages each comprising a plurality of generally radial portions located between opposite ends of the shaft and an axially extending portion communicating therewith and terminating in ports in the cam surface of the shaft, means in said housing and rigidly connected thereto defining a plurality of circumferentially spaced vane chambers, and a plurality of vane members extending radially from the actuator shaft into the vane chambers to divide each of the chambers into a pair of compartments, the compartment on one surface of the vane members being in communication with the radial portions of one set of gas flow passages and the compartment on the opposite surface communicating with the radial portions of the other set of gas flow passages in the shaft, the means defining the vane chambers and the housing having spaced and independent gas flow passages supplying gas to each compartment whereupon gas is continuously ported from the cam surface of the actuator shaft until the torque motor shaft is rotated to essentially close one port in the actuator shaft cam surface and one set of passages communicating therewith to create a pressure unbalance and cause rotation of the actuator shaft.

7. In combination with a torque motor having a shaft, the improvement which comprises an actuator having a housing and a radially passaged shaft therein provided with a cam surface at one end and axial passages communicating with the radial passages and terminating at said end in close relation to one end of the torque motor shaft, a plurality of circumferentially spaced block members secured interiorly of the housing and defining therebetween a plurality of vane chambers, and a plurality of vane members extending radially from the actuator shaft into the vane chambers to divide each of the chambers into a pair of compartments each of which is in communication with a generally radial passage in the actuator shaft, the housing having inlet ports therein and each block member having a pair of radially spaced passages communicating with the inlet ports and each of the compartments to supply gas thereto whereupon gas is continuously ported from the cam surface of the actuator shaft until the torque motor shaft is rotated to essentially close one of the axial passages terminating at said cam surface to create a pressure unbalance and cause rotation of the actuator shaft.

8. In combination with a torque motor having a shaft, the improvement which comprises an actuator having a housing and a shaft supported therein provided with a cam surface at one end closely adjacent one end of the torque motor shaft, the actuator shaft being provided with two sets of gas flow passages each comprising a plurality of generally radial portions located between opposite ends of the shaft and an axially extending portion communicating therewith and terminating in ports in the cam surface of the shaft, the axially extending portions being radially spaced and the radial portions of one set of passages being axially spaced from the radial portions of the other set, a plurality of circumferentially spaced block members secured to the inner diameter of the housing and extending radially inwardly to the actuator shaft to define a plurality of circumferentially spaced vane chambers, and a plurality of vane members secured to the shaft and extending radially outwardly therefrom into each of the vane chambers to define with opposed surfaces of adjacent block members a first and second compartment in each of the vane chambers, the housing having inlet ports therein and each block member having a pair of radially spaced passages communicating with the inlet ports, one radially spaced passage connecting with the first compartment and the other passage communicating with the second compartment to supply gas thereto, the first compartment being in communication with the radial portions of one set of shaft passages and the second compartment with the other set of passages whereby gas is ported from the axial portions of both sets of passages outwardly from the cam surface of the actuator shaft until the torque motor shaft is rotated to essentially block one set of passages, creating a pressure unbalance and causing rotation of the actuator shaft.

9. An actuator and motor assembly, comprising a motor housing and a shaft supported therein, an actuator housing connecting with the motor housing and mounting a shaft having a cam surface on one end positioned closely adjacent and axially aligned with the motor shaft, the actuator shaft being provided with a plurality of gas flow passages opening at the end of said shaft adjacent the motor shaft, means in the actuator housing and rigidly connected thereto defining a plurality of circumferentially spaced vane chambers, and a plurality of vane members on the actuator shaft extending radially into the vane chambers and dividing each of the chambers into a pair of compartments each of which is in communication with the passages in the shaft, the housing and the means therein defining the vane chambers having spaced and independent gas flow passages supplying gas to each compartment and from said compartments through the passages in the shaft to the end thereof, said gas continuously flowing from the shaft passages until one of said passages is essentially blocked by rotation of the motor shaft essentially into contact with the cam surface on the actuator shaft, whereupon a pressure unbalance is created and the actuator shaft caused to rotate.

10. An actuator and motor assembly, comprising a motor housing and a shaft supported therein, an actuator housing connecting with the motor housing and mounting a shaft having a cam surface on one end positioned closely adjacent and axially aligned with the motor shaft, the actuator shaft being provided with two sets of gas flow passages each comprising a plurality of generally radial portions located between opposite ends of the shaft and an axially extending portion communicating therewith and terminating at the end of said shaft adjacent the motor shaft, means in the actuator housing and rigidly fixed thereto defining a plurality of circumferentially spaced vane chambers, and a plurality of vane members on the actuator shaft extending radially into the vane chambers and dividing each of the chambers into a pair of compartments each of which is in communication with the passages in the shaft, the housing and the means therein defining the vane chambers having spaced and independent gas flow passages supplying gas to each compartment and from said compartments through the passages in the shaft to the end thereof, said gas continuously flowing from the shaft passages until one of said passages is essentially blocked by rotation of the motor shaft essentially into contact with the cam surface on the actuator shaft, whereupon a pressure unbalance is created and the actuator shaft caused to rotate.

References Cited in the file of this patent
UNITED STATES PATENTS

| | | |
|---|---|---|
| 2,708,353 | Brady | May 17, 1955 |
| 2,781,027 | Henry | Feb. 12, 1957 |
| 2,868,478 | McCloughy | Jan. 13, 1959 |
| 2,870,748 | Hemphill | Jan. 27, 1959 |
| 2,889,815 | Lloyd | June 9, 1959 |

FOREIGN PATENTS

| | | |
|---|---|---|
| 447,565 | Germany | Aug. 2, 1957 |
| 704,829 | Great Britain | Mar. 3, 1954 |

OTHER REFERENCES

Stambler: "Small Engines Key to ICBM Accuracy," Space Aeronautics Magazine, October 1958, pages 30–31.